C. H. THOMPSON.
SAFETY-VALVE.
No. 180,960.                            Patented Aug. 8, 1876.
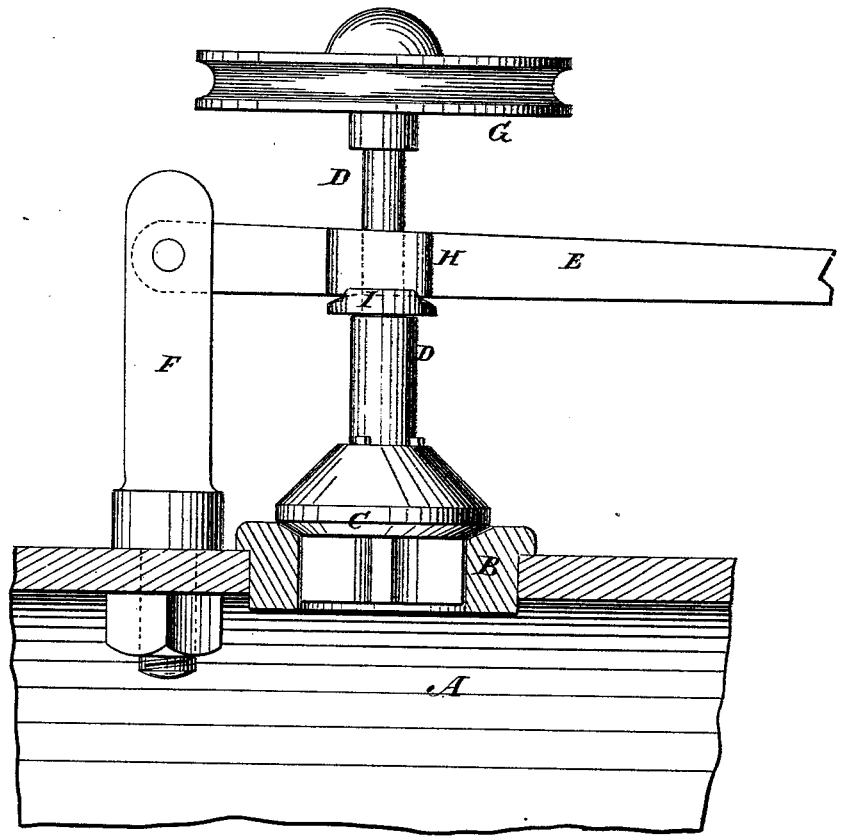

UNITED STATES PATENT OFFICE.

CHARLES HOMER THOMPSON, OF ST. PETERSBURG, PENNSYLVANIA.

IMPROVEMENT IN SAFETY-VALVES.

Specification forming part of Letters Patent No. 180,960, dated August 8, 1876; application filed February 13, 1875.

*To all whom it may concern:*

Be it known that I, CHARLES H. THOMPSON, of St. Petersburg, in the county of Clarion and State of Pennsylvania, have invented a new and useful Improvement in Safety-Valves, of which the following is a specification:

The invention will first be fully described, and then pointed out in the claim.

The accompanying drawing illustrates my invention.

Similar letters of reference indicate corresponding parts.

A represents a steam-boiler or other vessel under pressure. B is the valve-seat. C is the valve. D is the valve-stem. E is the lever. F is the fulcrum-stand, and G is a pulley on the valve-stem. The valve-stem passes up through a hole in the lever, as seen at H, the latter being enlarged around the hole to give it strength. I is a loose collar, which is fitted to the under side of the lever. On the top of the valve-stem is the pulley G, by means of which the valve is given a revolving motion on its seat, a belt or cord being applied to the pulley from any convenient part of the machinery for this purpose. Any other suitable means may be used to rotate the valve. The rotary motion of the valve prevents it from corroding and sticking on its seat, and leaves the valve free to be acted upon by steam-pressure at all times. The weight on the lever is set to the required pressure, so that any overpressure will raise the valve. There is, consequently, but little friction on the valve when it is rotating, while rotary movement renders it steam-tight. This arrangement overcomes the great difficulty which is experienced in safety-valves—the sticking of the valve on its seat or its non-action—which allows the steam to accumulate and boilers to explode.

The safety-valve may be connected with the engine-room, so as to be at all times solely under the control of the engineer, or it may be a "lock safety-valve," to insure it from being tampered with. This safety-valve may be applied to other vessels than steam-boilers, or for any purpose for which it may be adapted.

I am aware that valves have been constructed to be rotated on their axis in one direction by a slow and tedious process, and by the use of comparatively costly mechanism. The operation of my improvement or invention is such, however, that the valve C can be revolved in either direction, and as rapid as may be desired; that a short grinding motion may be given it to grind said valve to its seat at any time, to prevent the leakage and waste of steam, as well as to relieve it from sticking; also, that the application of my improvement to safety-valves in present use can be made at a small expense, as it only requires the lengthening of the stem, and forming a "boss" thereon for the lever to bear on, the perforating the lever for the stem to pass through, and the placing a pulley on said stem.

Having thus described my invention, I claim as new and desire to secure by Letters Patent—

The combination of valve C, stem D, provided with loose collar I and pulley G, lever E, and fulcrum F, all constructed and arranged to operate as and for the purpose specified.

CHARLES HOMER THOMPSON.

Witnesses:
W. H. FRAMPTON,
C. REICHART.